United States Patent [19]
Slater et al.

[11] Patent Number: 6,067,156
[45] Date of Patent: May 23, 2000

[54] WAVELENGTH CALIBRATION AND TRACKING METHODS AND APPARATUS

[75] Inventors: Joseph B. Slater, Dexter; James M. Tedesco, Livonia, both of Mich.

[73] Assignee: Kaiser Optical Systems, Ann Arbor, Mich.

[21] Appl. No.: 09/079,772

[22] Filed: May 15, 1998

Related U.S. Application Data

[60] Provisional application No. 60/046,678, May 16, 1997.

[51] Int. Cl.$^7$ .................. G01J 3/44; G01J 3/30; G01D 18/00
[52] U.S. Cl. .............. 356/301; 356/317; 356/318; 250/252.1; 250/339.07
[58] Field of Search .................. 356/301, 326, 356/317, 318; 250/222.1, 339.07

[56] References Cited

U.S. PATENT DOCUMENTS

| | | | |
|---|---|---|---|
| 4,681,444 | 7/1987 | Ferber et al. | 356/318 |
| 4,838,691 | 6/1989 | Master et al. | 356/319 |
| 5,341,206 | 8/1994 | Pittaro et al. | 356/301 |
| 5,452,084 | 9/1995 | Mitchell et al. | 356/301 |
| 5,452,723 | 9/1995 | Wu et al. | 128/664 |

*Primary Examiner*—Frank G. Font
*Assistant Examiner*—Zandra V. Smith
*Attorney, Agent, or Firm*—Gifford, Krass, Groh, Sprinkle, Anderson & Citkowski, PC

[57] ABSTRACT

Calibration wavelengths are injected into an optical detection system preferably at a point after laser rejection filtration, enabling the known spectral content of the calibration radiation to pass through and into a spectrograph. In a preferred embodiment, at least some of the wavelengths used for calibration are derived through the excitation of a noble gas such as neon, thereby conveniently and economically providing a full-spectrum calibration line set. The feed from the laser source used to illuminate the sample is also preferably introduced into the collection path, enabling both the calibration wavelengths and laser line to be detected and used in calibration. The invention is applicable to spectral analysis systems in general, including non-Raman systems and systems which do not require a laser notch pre-filter stage.

20 Claims, 2 Drawing Sheets

WAVELENGTH CALIBRATION AND TRACKING METHODS AND APPARATUS

REFERENCE TO RELATED APPLICATION

This application claims priority of U.S. provisional application Ser. No. 60/046,678, filed May 16, 1997, the entire contents of which are incorporated herein by reference.

FIELD OF THE INVENTION

This invention relates generally to optical detection and, in particular, to methods and apparatus for calibrating spectroscopic systems such as those used in Raman and fluorescence detection.

BACKGROUND OF THE INVENTION

Induced radiative techniques such as Raman and fluorescence detection have become useful tools in evaluating the properties of materials. Not only are such processes useful in determining unknown constituents, but the techniques are becoming increasingly popular in process-control situations to monitor the presence or absence of chemical precursors, intermediate products, and so forth.

To characterize a composition in a remote or hostile environment, optical fibers may advantageously be used to deliver excitation energy to a sample under investigation and to carry emitted radiation back to means for spectral analysis. An excitation source path may take the form of a laser providing a stimulus at a nominal wavelength coupled to an input fiber, and a collection path maybe made up of a second fiber carrying return radiative information to a spectral analysis tool such as a spectrograph.

Such remote spectral analysis presents technical challenges, however, including the strong scattering signature of the material used for the optical fiber, this interference potentially being generated by both the laser excitation in the illumination fiber and any strong Rayleigh (unshifted) scattering allowed to enter the collection fiber. These spurious fiber signatures can compete with, or even overshadow, the desired signature of the sample under test, particularly when long lengths of fiber are used.

In a typical system of this kind, a source of excitation is directed onto or into a substance under evaluation, be it a solid, liquid or gas, and the wavelengths emitted therefrom are analyzed in terms of their shift relative to the excitation wavelength. As some forms of detection, such as Raman detection, rely upon the discrimination of relatively weak signals, a notch filter is ordinarily included prior to detection to remove the excitation wavelength indicative of Rayleigh scattering so as not to overwhelm the much weaker shifted wavelengths of interest.

Although such systems operate upon a wavelength shift as opposed to an absolute value at one or more frequencies, it is still nevertheless important that such systems be calibrated in order to obtain an accurate reading. Automated internal wavelength calibration is ordinarily carried out in spectroscopic systems by physically moving a source of known spectral content into the field of view of the system. This normally blocks the external measurement bypass temporarily in order to execute the calibration procedure.

External wavelength calibration through the same light collection optics as used in sample measurement always provides the most accurate possible wavelength calibration. Internal calibration methods normally compromise accuracy to some extent due to slight differences in the intensity profile of a spectral line image at the detector or detector array.

Laser wavelength tracking and subsequent Raman shift correction are not normally carried out in Raman systems. The operating wavelength of the excitation laser is normally assumed to be accurately known, and Raman shifts of a measured spectrum computed accordingly. In addition, the high-efficiency laser blocking filter used to eliminate the much stronger Rayleigh scatter from the spectrometer, tends to render external injection of a laser tracking signal or calibrating reference emission lines near the laser wavelength problematic. This is unfortunate, since the operating wavelength of many solid-state lasers can change from day to day by an amount that can degrade the accuracy of Raman shift calculations by an amount significant to many spectroscopists.

SUMMARY OF THE INVENTION

This invention facilitates calibration of a Raman spectrograph near the laser line associated with sample illumination, thereby permitting a more precise subsequent measurement of the relevant shift spectrum relative to the laser's true operating wavelength. The invention improves upon existing spectroscopic calibration techniques by introducing one or more calibration wavelengths into the optical collection path, preferably at a point between the notch filter typically used to reject the laser-line, and the detector used to receive the Raman shift spectrum. Such an arrangement allows the known spectral content of the calibration radiation, including spectral regions near the laser wavelength that would otherwise be rejected by the notch filter, to pass through and into the spectrograph.

In one embodiment, the wavelengths used for calibration are derived through the excitation of a noble gas such as neon, though other sources may also be used, regardless of material phase, depending upon the technical feasibility and convenience of deriving appropriate wavelengths in conjunction with the sample under investigation. The use of neon is particularly convenient, however, since neon sources are readily available, and therefore low in cost. Neon also provides a full-spectrum calibration line set, and repeatable calibration parameters on an economical basis. For example, a commercially available neon bulb, energized in a conventional manner for excitation purposes, may be used as a source of calibration wavelengths.

A portion of the laser energy used for sample illumination may also be introduced into the collection path "downstream" of the notch filter as part of the invention for calibration purposes. Although this may be accomplished through a slight rotation of the notch filter or processing during fabrication to permit a relatively reduced level of laser energy to bleed through the filter during operation, according to a preferred configuration a portion of the laser energy is instead purposefully routing into the collection path, as with a separate optical fiber.

In a preferred embodiment, both the non-laser (i.e., neon) and laser wavelengths used for calibration purposes are co-injected into the optical collection path "downstream" of the notch filter, either through separate optical routes or along an integrated path, thereby permitting direct calibration of the laser line against the known source. Conveniently, in the case of an excited gas in a transparent bulb, a portion of the laser energy used to illuminate the sample is routed through the bulb to establish a combined laser/non-laser calibration source. Various alternative techniques may be used to introduce either the laser or non-laser calibration wavelengths in to the collection path, including the use independent optical fibers, one or more reflectors or beam splitters, or through an appropriately sized aperture formed in an optical element disposed in the path. In each case, the co-injection is preferably engineered so as to have minimal impact on the transmission of light from the sample under test.

BRIEF DESCRIPTION OF THE INVENTION

DETAILED DESCRIPTION OF THE INVENTION

This invention improves upon existing spectroscopic calibration techniques by introducing one or more calibration wavelengths into the optical collection path, preferably at a point between laser rejection and shift detection, thereby permitting a more precise, subsequent measurement of the relevant shift spectrum relative to the laser's true operating wavelength. The invention finds particular utility in Raman spectroscopy, since systems of this type conventionally incorporate a laser pre-filter stage, and wherein knowledge of that laser wavelength is critical. However, the concepts disclosed herein may also be generally applied to other spectral analysis systems, such as laser-induced fluorescence, as well as laser wavelength tracking. Non-laser instruments may also use a modified version of the inventive methods of apparatus, for instance, to expressly eliminate one end of the entrance slit of a standard spectrometer. The concepts apply equally well to both dispersive Raman and FT Raman configurations. Certain of the approaches are also applicable to non-Raman systems and other systems which do not require a laser notch pre-filter stage.

Figure 1:
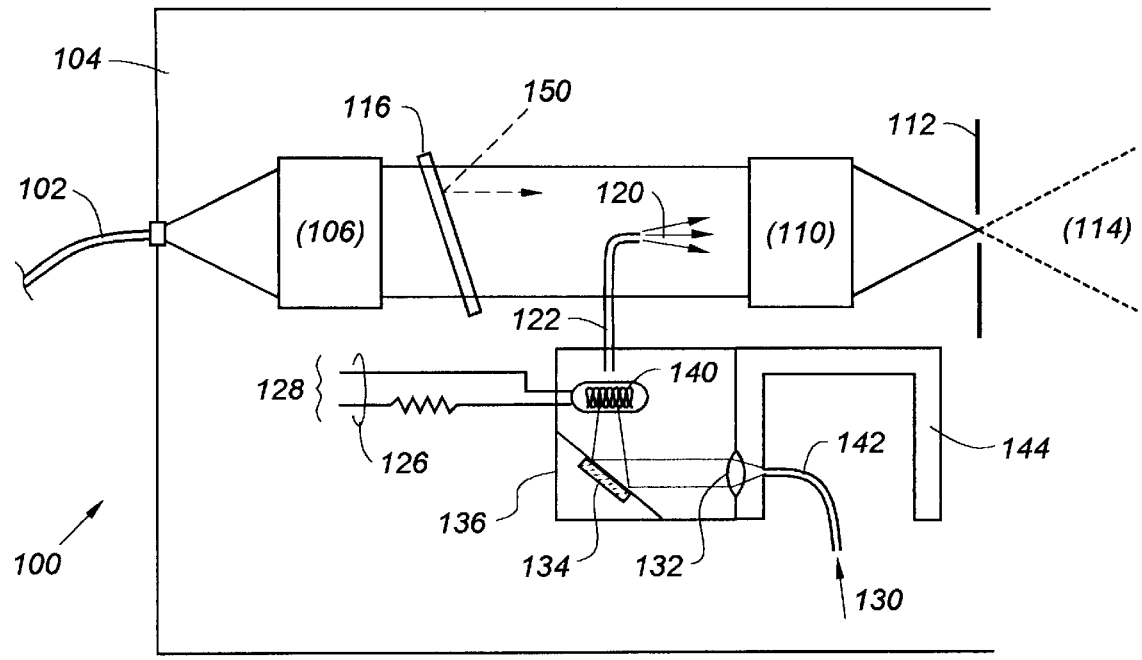
FIG. 1 is a schematic drawing illustrating a preferred embodiment of the invention.

Turning now to the drawings, FIG. 1 illustrates generally at 100 apparatus according to a preferred embodiment of the invention. Wavelengths collected from a sample are directed along path 102 into a first lens or lens assembly 106, creating a collimated region of light 108, which is then focused by an additional lens or lens assembly 110 onto the entrance slit 112 of a standard monochromator 114 including detection means (not shown).

Although this and other arrangements described herein will focus on the use of a standard monochromator, the other applications referenced in the Summary of the Invention must be kept in mind as alternative configurations. In addition, although a fiber is shown as the means for carrying energy collected from a sample by way of path 102, the invention is equally applicable to direct-injection types systems, that is, wherein wavelengths emitted by a sample are fed directly into the instrument 104 without the need for fiber transport.

Between the lens assemblies 106 and 110, there is disposed a rejection or notch filter 116 used to remove the laser wavelength from the collimated collection path 108. Without such a filter, Rayleigh scattering of the laser from the sample under test would normally overwhelm the weak Raman signals being analyzed. As a consequence, very little, if any, of the laser wavelength is present in the collection path "downstream" of the filter 116 (to the right in FIG. 1). According to the invention, it is within this portion of the collection path downstream of the notch filter 116 that one or more calibration wavelengths 120 are introduced.

In the embodiment shown, these wavelengths are co-injected into the collimated collection path through the use of a small-diameter light-carrying conduit 122. The conduit 122 is fed by a source of calibration wavelengths in the form of a neon bulb 140, which may be powered in a conventional manner through electrical connections 126 interconnected to a source of power 128 (not shown). In particular, the path 122 preferably comprises a 0.060-inch or smaller fiber contained within a thin-wall steel tube, bent as shown. The stiffness of the outer metal tube provides for repeatability and low obscuration of the sample signal. It will be apparent to one of skill that other metals and additional fibers, including fibers having different diameters, as well as rigid light pipes not requiring the support of an outer tube may be substituted in accordance with the invention.

Continuing the reference to the particular embodiment of FIG. 1, light sampled from the laser source 130 is directed along an independent optical path 142, to a lens 132, resulting in an imaged beam which reflects off of a reflector 134 and into the ionized gas of the bulb 140 to create a source of laser calibration wavelengths, also carried by path 122, and emerging as rays 120 along with the non-laser calibration wavelengths derived from the neon contained within bulb 140. Optional enclosures 144 and 136 may be provided for optical separation purposes, as appropriate.

Figure 2:
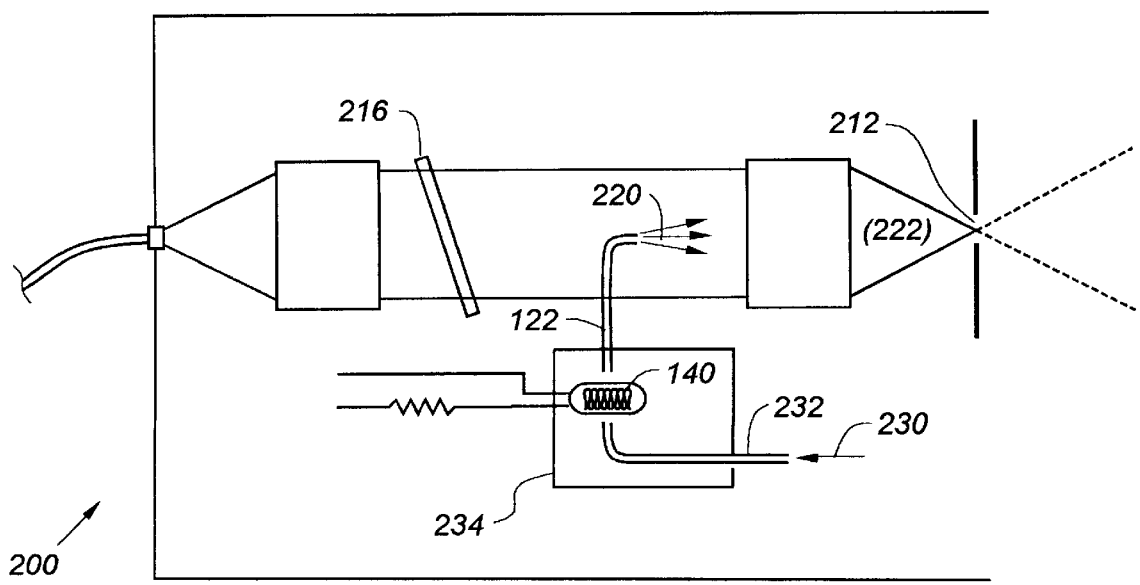
FIG. 2 is a schematic drawing illustrating a simplified version of the preferred embodiment of FIG. 1.

FIG. 2 depicts an alternative, more simplified version of the arrangement discussed with reference to FIG. 1, wherein the sampled laser light 230 is routed directly to the side of the bulb 140 through an optical fiber 232 without additional optics such as focussing lens 132 or reflector 134. Other techniques for establishing and injecting an integrated laser/non-laser calibration source are possible, so long as sufficient calibration wavelengths are detectable in the vicinity, and preferably at, the laser line.

Indeed, sampled laser light may be introduced separately and independently of the non-laser calibration wavelengths, as suggested by path 150, which reflects off the back side of the notch filter 116. Other configurations are also possible, as discussed below with reference to FIGS. 3 and 4. Note also that, as in the case of FIG. 1 and the other embodiments discussed herein, it is not necessary that injection of the laser or non-laser wavelengths take place prior to the second focusing lens assembly; rather, such wavelengths may be present in the focused cone 222 or, indeed, at any point between the filter 216 and slit 212, in the case of a spectroscopic application.

Figure 3:
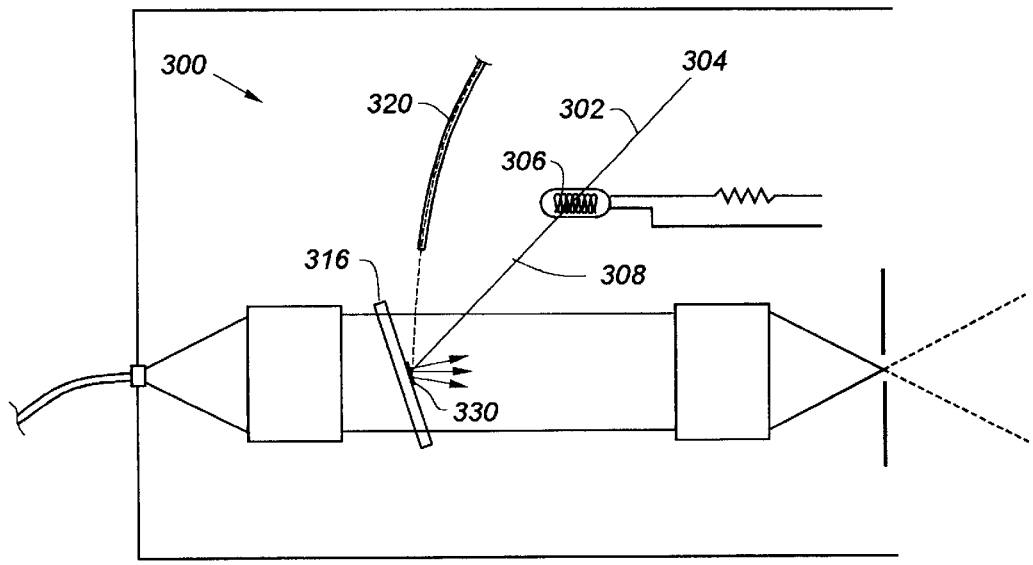
FIG. 3 illustrates an alternative embodiment of the invention utilizing a 'spot' reflector for calibration wavelength injection purposes.

FIG. 3 illustrates an alternative embodiment of the invention wherein the sampled laser source 304 is directed along path 302 to source 306 of non-laser calibration wavelengths, such that an integrated calibration beam 308 emerges therefrom. In this case, the wavelengths impinge upon a reflective element 330 such as a "spot" mirror which may be affixed directly to the notch filter 316 or, alternatively, a different optical element, including a transparent window, supported between the filter and the detector.

As discussed above, instead of a combined laser/non-laser calibration beam, laser energy may be introduced separately, as through fiber 320. In such a case it may be advantageous to utilize a reflective diffuser as element 330, enabling sufficient amounts of the laser and non-laser wavelengths to be directed generally toward the slit and detector. That is, if enough neon and sampled laser light are available, the weak scattering of the filter element may alone suffice to inject a sufficient amount of light to permit calibration.

Figure 4:
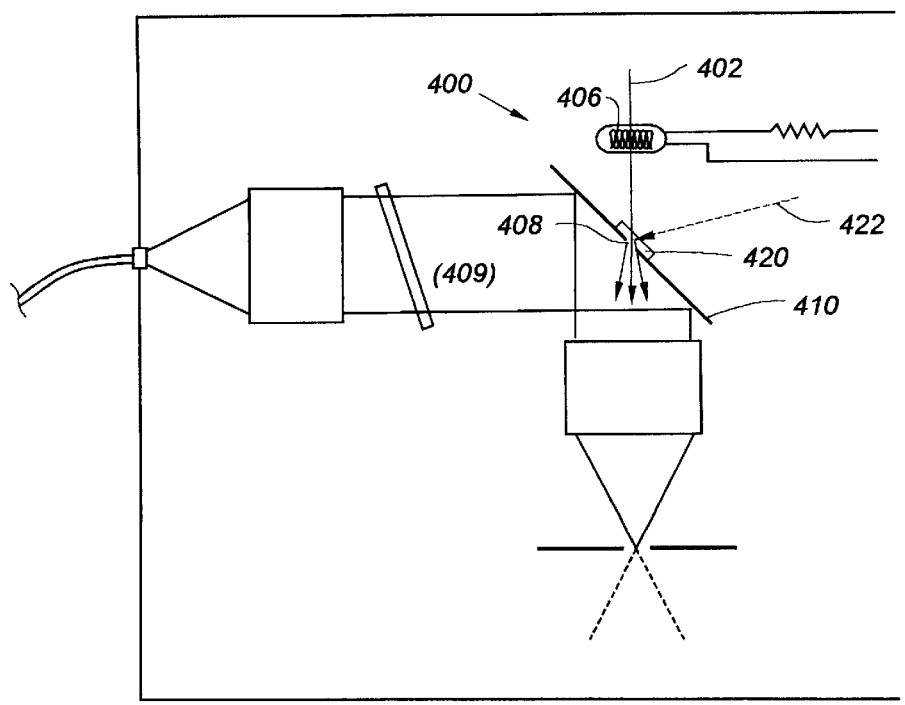
FIG. 4 illustrates yet a further alternative embodiment according to the invention wherein calibration wavelengths are introduced into a collection path through an appropriately sized aperture.

FIG. 4 illustrates yet a further embodiment of the invention wherein a source 402 is directed through a bulb 406 and into an aperture 408 formed in an optical element 410, the element 410 being operative to redirect the collimated collection path 409, as shown. The element 410 may be any optical element suitable for the combined purposes shown, including an apertured mirror, beam splitter, and so forth. Again, laser light may be introduced along a separate path such as 422, in which case a diffuser 420 may be used to ensure that at least a portion of both the laser and non-laser wavelengths are co-injected.

In conclusion, apparatus and methods have been disclosed in conjunction with the automatic calibration of an optical detection system of the type used in Raman, fluorescence, and other forms of optical investigation. According to the invention, light having a known spectral content, such as that emitted by a neon source, is used for wavelength calibration according to a novel optical configuration, preferably making use of one or more optical fibers. The co-injection of a small amount of light from the excitation laser used for sample illumination is also preferred for laser wavelength tracking. Due to the fact that such injection takes place "downstream" of the laser notch filter, the laser light sample can pass through the spectrograph, providing for straightforward calibration.

An advantage is that there are no moving parts in any embodiment, resulting in robust and repeatable configurations. The fiber-optic embodiments impart minimal obscuration to the external measurement path (ROM of 1 to 3 percent), allowing the injector(s) to remain in place at all times with minimal impact on wavelength signal-to-noise ratio. Accordingly, sample measurement, spectrometer wavelength calibration, and laser wavelength tracking may be performed independently or simultaneously, as appropriate, to the application. For example, in Raman spectroscopy with an array detector, the laser wavelength signal can be superimposed on the spectrum of a sample measurement occurring in real time, allowing the control software to automatically compute an accurate Raman shift spectrum independent of the laser wavelength or instrument response shift(s). Due to the high repeatability of the system, agreement between the automatic internal calibration and the most accurate possible external calibration may be further improved through a one-time measurement of the small difference between internal and external calibration; subsequent internal calibrations may then be corrected by this difference.

We claim:

1. In an optical system of the type wherein a filter is used to block one or more wavelengths emitted by a sample along a collection path from reaching a detector, means for calibrating such a system, comprising:

a source of one or more calibration wavelengths; and means for introducing the calibration wavelengths into the collection path at a point between the filter and the detector.

2. The system of claim 1, wherein the system is a Raman detection system.

3. The system of claim 1, wherein the system is a fluorescence detection system.

4. The system of claim 1, wherein the source of one or more calibration wavelengths includes an ionized gas.

5. The system of claim 1, wherein the gas is a noble gas.

6. The system of claim 1, wherein the gas is neon gas.

7. The system of claim 1, wherein the means for introducing the calibration wavelengths into the optical path includes a light-conductive conduit to carry the wavelengths.

8. The system of claim 1, further including a laser source for sample illumination, and wherein a portion of the laser illumination is used as a source for calibration of Raman wavelength shifts.

9. The system of claim 1, wherein the means for introducing the calibration wavelengths into the optical path includes a light-reflective element disposed in the collection path to redirect the wavelengths from the source into the path.

10. The system of claim 1, wherein the means for introducing the calibration wavelengths into the collection path includes an element disposed in the optical path having an aperture through which the calibration wavelengths pass.

11. A calibrated optical detection system, comprising:

a source of monochromatic illumination having a nominal wavelength;

means for directing illumination from the source to a sample such that wavelengths characteristic of the sample are emitted therefrom along a collection path;

an optical detector supported in the collection path to receive the wavelengths emitted by the sample;

a filter disposed in the collection path to remove the nominal wavelength from the wavelengths emitted by the sample before reaching the detector;

a source of one or more calibration wavelengths; and means for introducing the calibration wavelengths into the collection path at a point between the filter and the detector.

12. The calibrated optical detection system of claim 11, wherein the system is configured for Raman detection.

13. The calibrated optical detection system of claim 11, wherein the system is configured for fluorescence detection.

14. The calibrated optical detection system of claim 11, wherein the source of one or more calibration wavelengths includes an ionized gas.

15. The calibrated optical detection system of claim 11, wherein the gas is a noble gas.

16. The calibrated optical detection system of claim 11, wherein the gas is neon gas.

17. The calibrated optical detection system of claim 11, wherein the means for introducing the calibration wavelengths into the optical path includes a light-carrying conduit.

18. The calibrated optical detection system of claim 12, wherein light from the source of illumination is used as a source for calibration of the Raman wavelength shifts.

19. The system of claim 11, wherein the means for introducing the calibration wavelengths into the optical path includes a light-reflective element disposed in the collection path to redirect the wavelengths from the source into the path.

20. The system of claim 11, wherein the means for introducing the calibration wavelengths into the collection path includes an element disposed in the optical path having an aperture through which the calibration wavelengths pass.

* * * * *